United States Patent [19]

Kine

[11] 3,935,930
[45] Feb. 3, 1976

[54] FLUID PRESSURE BRAKING SYSTEM FOR A BICYCLE

[75] Inventor: Masayoshi Kine, Sakai, Japan

[73] Assignee: Shimano Industrial Company, Limited, Osaka, Japan

[22] Filed: Apr. 29, 1974

[21] Appl. No.: 465,134

[30] Foreign Application Priority Data
May 4, 1973  Japan.............................. 48-52941

[52] U.S. Cl.............. 188/344; 60/584; 188/196 M; 188/351
[51] Int. Cl.² ......................................... B60T 11/22
[58] Field of Search ............ 60/535, 550, 572, 584, 60/592; 188/344, 152, 351, 196 A, 196 M

[56] References Cited
UNITED STATES PATENTS

| | | | |
|---|---|---|---|
| 1,857,413 | 5/1932 | Tatter | 60/592 |
| 2,050,682 | 8/1936 | White | 188/196 M |
| 2,153,042 | 4/1939 | Graziano | 188/196 M |
| 2,345,811 | 4/1944 | Harp | 188/196 A |
| 3,554,334 | 1/1971 | Shimano | 188/344 |

FOREIGN PATENTS OR APPLICATIONS

| | | | |
|---|---|---|---|
| 1,239,805 | 7/1971 | United Kingdom | 188/344 |
| 395,042 | 2/1909 | France | 188/344 |
| 621,342 | 4/1949 | United Kingdom | 188/344 |

Primary Examiner—Trygve M. Blix
Assistant Examiner—Edward R. Kazenske
Attorney, Agent, or Firm—Stevens, Davis, Miller & Mosher

[57] ABSTRACT

A fluid pressure brake system for a bicycle or a motorcycle having a master cylinder which is provided with an excess portion extending from the end of the cylinder to have a given length more than a maximum pressure stroke of the piston of the master cylinder; this portion is provided internally thereof with an adjusting member controlling the inner volume thereof. Thus, the adjustment of the adjusting member keeps the brake action so as to be constantly responding to a predetermined swing of an operating lever at a handle bar despite leakage of fluid and wear of brake padding, thereby making it possible to perform consistent braking action.

3 Claims, 2 Drawing Figures

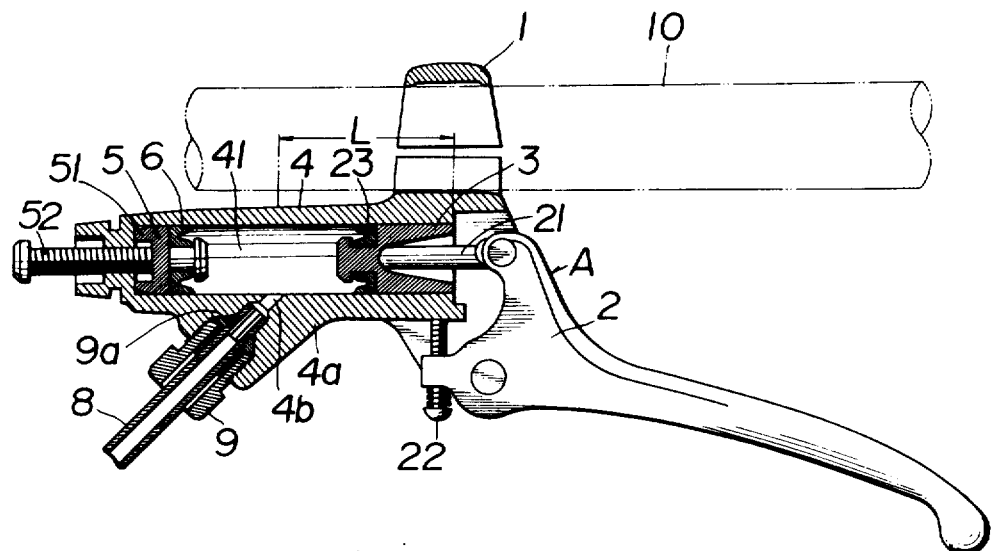
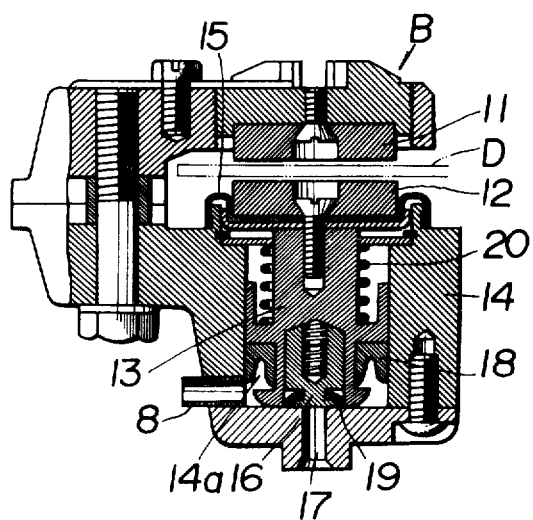

FLUID PRESSURE BRAKING SYSTEM FOR A BICYCLE

This invention relates to a fluid pressure brake system for a bicycle or a motorcycle and more particularly to a fluid pressure brake system for a bicycle or a motorcycle, which is so adapted that an operating lever mounted on a handlebar of a bicycle or a motorcycle actuates a piston of a master cylinder to act a braking mechanism at a wheel by means of the fluid pressure applied with the piston thereby acting the brake of the bicycle or the motorcycle.

Conventionally, a fluid pressure brake system has been used for a bicycle or a motorcycle, however, in the system of this kind the fluid filled therein has frequently leaked slightly from, for example, the joint of a master cylinder with a conduit resulting in the decrease of the fluid after long use. This resulted in the disadvantage that the pressure stroke of the piston of a slave cylinder at the braking mechanism was shortened with respect to a given motion of an operation lever so that the braking effect was impaired.

When a braking member, for example a padding used in the braking mechanism, is worn after a long use even with a constant pressure stroke of the piston, the braking action may not be sufficient to complete a desirable braking effect.

From this point of view, the present invention seeks to entirely eliminate the disadvantages caused by the reduced braking effect as the abovementioned, a main object being to provide a fluid pressure brake system which acts always exactly with a constant swing of an operating lever even though the supply of actuating fluid may be decreased by leakage from the brake system or wear of the padding of the braking member.

Another object of the invention is to provide a brake system which is simple in construction, easy to produce and adjustable by a simple operation thereof.

The invention will be described in details hereinafter and a novel characteristic thereof is that a master cylinder has a piston cooperatively movable with an operating lever motion. This lever extends from the end portion thereof to have a dimension longer than the maximum pressure stroke of the piston so as to form an excess chamber internally of the cylinder in which an adjusting member is provided for making it possible to change the inner volume of the extended portion of the cylinder by outer operation thereof.

An embodiment of the invention will be described in detail in accordance with the accompanying drawings as follows, in which;

FIG. 1 is a longitudinal sectional view of a main body operable with an operating lever in an embodiment of the invention, and FIG. 2 is a longitudinal sectional view of a braking mechanism thereof.

Referring to FIG. 1, a pressure fluid brake system in accordance with the present invention has a main body A at the operation side of the brake system, which comprises an operating lever 2 pivoted to a bracket member 1 fixed to a bicycle frame, such as a handlebar. A master cylinder 4 having a piston 3 cooperates through a swing motion of the operating lever 2, to a braking mechanism mounted, as shown in FIG. 2, to a front or rear wheel of a bicycle.

The master cylinder 4 provided on the main body at the operating side of the fluid pressure brake system, is fixed to the bracket member 1. One end portion of the master cylinder is extended longitudinally thereof in a given length to form a reserve chamber 41 therein which is larger in dimension than the maximum pressure stroke 1 of the piston 3 co-operable with the operating lever 2. The reserve chamber 41 is internally provided with a volume-adjusting member 5 opposite to the piston 3 within the master cylinder 4.

The adjusting member 5 comprises a notched piston 51 having at the intermediate portion thereof a seal packing 6, and an adjusting screw bolt 52 having one end thereof abutting against a concaved surface of the rear surface of the notched piston 51 and the other end thereof projecting outwardly of the distal end wall of the master cylinder 4.

The end of the adjusting screw bolt 52 abuts against the rear surface of the notched piston 51 as abovementioned, whereby screw operation of the bolt 52 permits the notched piston 51 to be moved toward the piston 3 within the master cylinder 4.

In addition, a pressure fluid supply conduit 8 which has a pressure fluid therein and leads to the braking mechanism B is connected to the master cylinder 4 substantially at the intermediate portion thereof, and inclined toward the head surface of the piston 3 at the maximum pressure stroke position thereof.

As is clearly understood in FIG. 1, at the intermediate portion of the master cylinder there is provided a thick wall 4a with a hole 4b ) slantwise opening into the inside of master cylinder for communicating the conduit 8 with the master cylinder through a compression fitting 9. The conduit 8 is inserted into the communicating hole 4b with compression fitting 9 having at its end a conical seal 9a so as to be fixed to the master cylinder at the thick wall portion thereof.

Further, the abovementioned braking mechanism B has, as shown in FIG. 2, a disc brake mechanism having a padding 11 which is fixed thereto opposite to one face of a disc D of the axle of the rear wheel of the bicycle. A movable padding 12 rigidly connected with a piston 13. The piston 13 is provided internally of a slave cylinder 14 co-operable with the master cylinder and the conduit 8 is connected to the pressure chamber 14a of the slave cylinder 14 at the bottom thereof.

In FIG. 1, the numeral 21 denotes a rod connecting the operating lever 2 with the piston 3, numeral 22 denotes a stop screw for the operating lever 2 and 23 denotes a seal packing used in the piston 3. In FIG. 2, the numeral 15 denotes a bellows type seal, 16 denotes a check value, 17 denotes an opening for filling pressure fluid into the brake system, 18 denotes a packing used in the piston 13, 19 denotes a seal packing used in the check value 16, and 20 denotes a return coil spring for the piston 13.

Incidentally, when the pressure fluid brake means is used for a bicycle or a motorcycle, it is filled with pressure fluid mainly such as oil in a manner that the fluid flows into the master cylinder 4, the slave cylinder 14 and the conduit 8 through the opening 17 under the condition that the pistons 3 and 13 are at the starting position thereof and the adjusting member 5 is at the position as illustrated in FIG. 1 respectively.

Accordingly, when the operating lever 2 acts to move the piston 3 from the starting position thereof, oil within the master cylinder 4 is exposed to pressure from the piston 3 and the pressure is transmitted through the conduit 8 to the slave cylinder 14 of the braking mechanism B so as to actuate the piston 13 force the padding 12 to be brought into contact with the disc D of the disc brake, thereby acting to stop the wheel of the bicycle from rotation. Further, when the operating lever 2 is restored to a normal position, the return stroke of the piston 3 discharges the fluid pressure and then the return force of a return spring 20 of braking mechanism B causes the piston 3 and 13 to be restored for releasing the brake action.

In the case that the fluid is reduced in quantity in use of the brake system as aforementioned, it is not necessary to refill the fluid to compensate for a reduction because the adjusting member 5 can be moved inwardly of the master cylinder in an axial direction thereof so as to offset the fluid reduction by reducing the volume of the reserve chamber 41 of the master cylinder. The reduced quantity of the fluid permits the pressure stroke of piston 3 to be defined in a given length associated with the predetermined action of the operating lever 2 thereby making it possible to eliminate the deterioration of braking action of the braking mechanism B.

When the padding 11 and 12 of the braking mechanism is sufficiently worn, the braking action of the same becomes incomplete in spite of proper action of pressure fluid for transmitting the pressure applied thereon, namely, the movement of piston 3 and 13 properly responding to the operating lever action. In this case, the adjusting member 5 is screwably moved inwardly of the reserve chamber 41 of the extended portion of master cylinder for reducing the volume thereof so that the pressure fluid within the reserve chamber 41 is conveyed to the slave cylinder 14 of the braking mechanism B so as to move the piston 13 toward the disc D a distance corresponding to the reduction of thickness of the movable padding caused by wear thereof. Thus, such adjustment of the piston 13 associated with the padding 12 is compensated for so that the lever action of the disc brake can be again achieved.

As is clearly understood, the pressure fluid brake system in accordance with the present invention employs a single master cylinder of which the inner volume is variable to compensate for the reduction of pressure fluid or to complement the wear of the movable padding so that the braking mechanism does not experience deterioration of braking action caused by both reduced fluid and worn padding, thereby making it possible for the braking mechanism to properly respond to a constant lever action of the fluid pressure brake system.

Incidentally, the embodiment of the invention has been described regarding use for a bicycle, but a motorcycle use is also applicable. In addition, a disc brake is represented as the braking mechanism, however, it is contemplated to employ a calliper brake, a rim brake or a hand brake.

While an embodiment of the invention has been shown and described, the invention is not limited to the specific construction thereof but only by the appended claims.

What is claimed is:

1. A pressure fluid brake system for a bicycle or a motorcycle, comprising;
   a. an operating lever for a handlebar of said bicycle or motorcycle,
   b. a master cylinder having a piston mounted for movement with and by said operating lever from one end thereof, said master cylinder being longitudinally extended at the other end thereof to a length greater than the pressure stroke of said piston so as to form a reserve chamber in said cylinder, said reserve chamber being at the other end portion of the cylinder,
   c. an adjusting member in said reserve chamber for changing the volume of said reserve chamber, said adjusting member having a portion thereof projected outwardly of said extended portion so as to be operable from the outside of said reserve chamber,
   d. a braking mechanism mounted on a wheel of the bicycle or motorcycle, said braking mechanism having a body with a slave cylinder having a piston mounted for movement co-operable with motion of the piston of said master cylinder,
   e. a pressure fluid supply conduit connecting said master cylinder with said slave piston of the braking mechanism, said conduit opening into said master cylinder at a position intermediate the ends thereof, said conduit and said cylinders being filled with fluid such as oil,
   f. said adjusting member which changes the volume of said reserve chamber being the only means compensating for leakage of fluid and wear of the braking mechanism, and
   g. the piston in the master cylinder and the adjusting member being coaxial with the longitudinal axis of the master cylinder.

2. The pressure fluid brake system as set forth in claim 1, wherein said adjusting member is a piston and a screw member, said piston having an outer diameter substantially equal to the inner diameter of said extended portion of the master cylinder, said screw member having one end abutting said piston at the rear surface thereof and the other end projecting outwardly of said master cylinder in an axial direction thereof thereby to be operable from the distal end of said projected portion.

3. The pressure fluid brake system as set forth in in claim 1, wherein said reserve chamber of said master cylinder has an inner diameter at least equal to that of said master cylinder.

* * * * *